Nov. 20, 1945.    J. W. ASPENLEITER    2,389,116
OPHTHALMIC MOUNTING
Filed Jan. 13, 1944
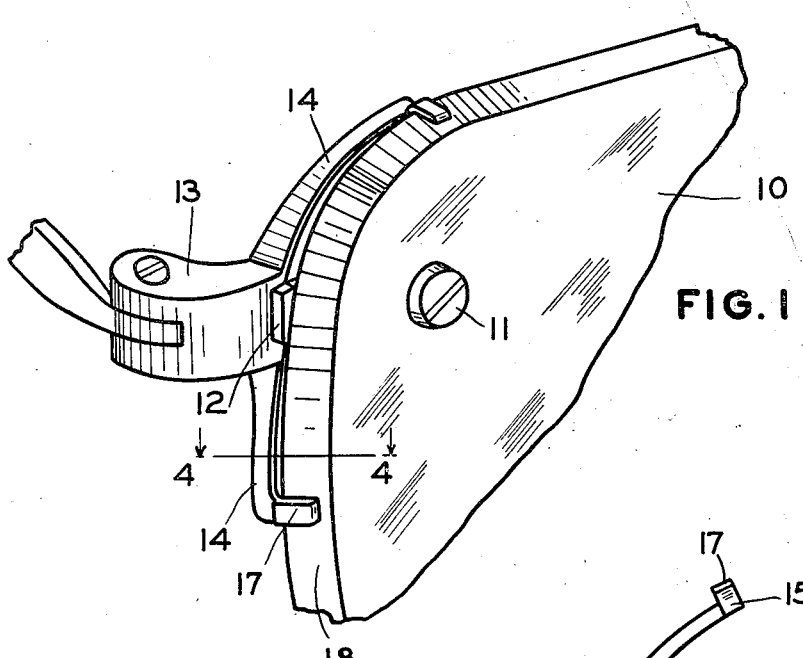
FIG. 1
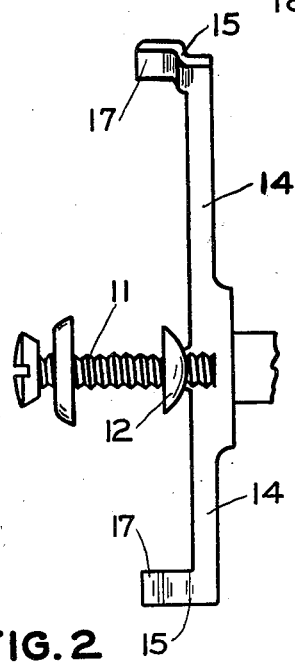
FIG. 2
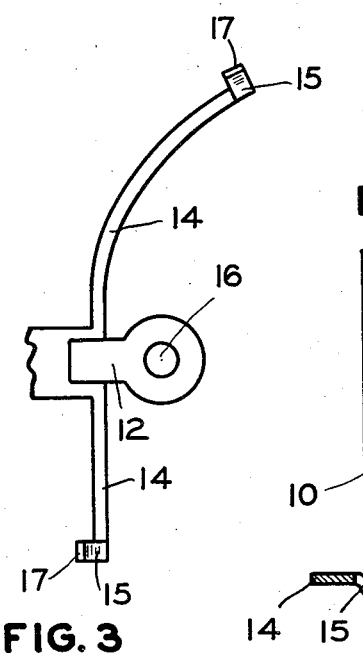
FIG. 3
FIG. 4
JOSEPH W. ASPENLEITER
INVENTOR
BY
ATTORNEYS Patented Nov. 20, 1945

2,389,116

UNITED STATES PATENT OFFICE 2,389,116

OPHTHALMIC MOUNTING

Joseph W. Aspenleiter, Rochester, N. Y., assignor to Bausch & Lomb Optical Company, Rochester, N. Y., a corporation of New York Application January 13, 1944, Serial No. 518,083

3 Claims. (Cl. 88—47)

This invention relates to ophthalmic mountings and more particularly to a rimless mounting.

Rimless spectacles have been worn for many years and those in which the lenses were secured by screws have proved troublesome in that the screws frequently worked loose and failed to securely hold the lenses in the desired position in the mountings. This displacement of the lenses often impaired the visual acuity of the wearer for where astigmatic or like conditions exist, the lenses must be held in a predetermined position before the eyes of the wearer.

It is the principal object of the present invention to provide an ophthalmic mounting for rimless spectacles which, while employing screws for holding the lenses in the mounting, will securely maintain the lenses in the desired position relative to the mounting. In the preferred embodiment of the invention, means are provided for preventing movement of the screws by employing with each screw an elongate member connected to the rear lens strap and formed at the opposite ends thereof with means for engaging the rear surface of the lens.

The member normally holds the lens strap out of contact with the lens but is formed of a material sufficiently resilient to permit the strap to be drawn up against the rear surface of the lens. In the assembly of a lens in the mounting of the present invention, the screw is passed through the usual drilled opening at the lens edge and threaded into the lens strap to draw the latter against the rear surface of the lens. As the member tends to urge the strap away from the rear surface of the lens, the threads of the strap are urged against the threads of the screw and the frictional engagement is such that the screw will be held against accidental rotation. Accordingly as the mounting screws are held against accidental rotation, the lens will be securely held in the mounting and no displacement of the lenses will take place during the ordinary use of the spectacle.

Although means have been heretofore proposed for holding mounting screws in rimless mountings against accidental rotation, they have consisted generally of either a plurality of small elements difficult to assemble or elements which required special tools or equipment. The means of the present invention is formed integral with or permanently fixed to each lens strap and the lenses can be mounted in the mounting of the present invention as easily as in a conventional rimless mounting and without the use of special tools.

As the member is given a shape similar to the shape of the lens edge and as the member lies just back of the edge, the member is not easily seen and, therefore, will not detract from the appearance of the mounting when worn.

To prevent the lens from pivotally moving about the screw, the member is provided with a pair of pads adapted to engage the edge face of the lens on opposite sides of the strap. The pads are sufficiently rigid to prevent accidental bending thereof, but they can nevertheless be bent during the assembly of the lenses with the mounting to insure that they are properly adjusted.

Other objects and advantages of the mounting of the present invention will be apparent from the following description taken in connection with the accompanying drawing in which:

Fig. 1 is a perspective view of a portion of a spectacle lens with my novel mounting as applied to the temple endpiece.

Fig. 2 is a side elevation of the mounting with the lens removed.

Fig. 3 is a front elevation of the mounting.

Fig. 4 is a section taken on line 4—4 of Fig. 1.

In the illustrated embodiment of the mounting of the present invention, referring now to the drawing and particularly Fig. 1 thereof, the lens 10 is secured to the temple endpiece illustrated by a screw 11 passed through a drilled opening in the lens and threaded into a tapped opening formed in a lens strap 12 at the rear of the lens. The strap 12, in the illustrated embodiment of the mounting, is shown as connected to the usual endpiece 13 and it will be understood that the strap on the opposite side of the lens will be connected to the bridge of the mounting. Extending outwardly from the endpiece 13 on opposite sides thereof are a pair of arms 14, each terminating in a lens engaging shoe 15 formed by laterally deforming the free ends of the arms as best shown in Fig. 4. The arms 14 may be integrally formed with the endpiece 13 or may be separately formed and permanently secured to the endpiece 13 by soldering the same thereto. The shoes are adapted to engage the rear surface of the lens 10 at points spaced on opposite sides of the strap and any pressure exerted by the shoes is, therefore, spaced from the drilled opening of the lens.

The arms 14 should be so formed that the strap 12 will be spaced from the rear surface of the lens 10 when the lens engaging shoes 15 are brought up into engagement with the rear surface of the lens. The arms are formed of a material sufficiently resilient that they will flex and permit the strap 12 to be drawn up against the rear surface of the lens 10 when the screw 11 is threaded into the aperture 16 of the strap. As the arms 14 tend to urge the lens away from the strap, the threads of the strap are urged against the threads of the screw 11 and the frictional engagement between the threads is such that the screw will be held against accidental rotation. Although the screw 11 will be held against accidental rotation, it will be obvious that the screw nevertheless can be removed in the usual manner if necessary.

The arms 14 should be of such a shape that they will lie just back of the edge of the lens. As lenses to be fitted in rimless mountings are generally beveled, the arms will be deposed just to the rear of the beveled edge and will be hidden thereby. The arms will, therefore, not detract from the appearance of the mounting when worn by a patient.

To prevent the lens 10 from pivotally moving about the axis established by the screw 11, the lens engaging shoes 15 are provided with pads 17 formed by laterally bending the extreme ends of the shoes 15. The pads 17 as clearly shown in the Fig. 1, engage the edge face 18 of the lens 10 on opposite sides of the strap 12. Although the pads are sufficiently rigid to prevent accidental bending of the same, they can nevertheless be bent by a suitable tool during the assembly of the lenses with the mounting to insure that the pads are properly adjusted so that they will hold the lens against pivotal movement about the screw 11.

Although the preferred embodiment of the present invention has been illustrated and described herein, it is to be understood that the invention need not be limited thereby but is susceptible of changes in form and detail within the scope of the appended claims.

I claim:

1. In an ophthalmic mounting, a lens; a strap having a face adapted to engage the rear surface of said lens; a screw passed through an opening in said lens and threaded into an opening formed in said strap for securing the lens to said strap with the rear surface of the lens engaging the face of the strap; resilient arms extending outwardly on opposite sides of said strap; lens engaging portions carried by the free ends of said arms, said arms normally urging said portions into engagement with the rear face of said lens at spaced areas adjacent the edge thereof to produce an axial thrust by the strap on the threads of said screw to prevent accidental rotation thereof; and pads carried by said portions and engaging the edge face of said lens to restrain pivotal movement of said lens relative to said screw.

2. An ophthalmic mounting comprising a strap; a lens; a screw passed through an opening in said lens and threaded into an aperture formed in said strap for securing said strap to the rear face of said lens; resilient arms extending outwardly on opposite sides of said strap, said arms overlying the adjacent rear surface of said lens and curved to normally coincide with the edge of said lens, the free ends of said arms engaging the adjacent rear surface of said lens only at points spaced from said strap and adjacent the edge of the lens and urging said lens away from said strap to bind the threads of said screw; and means formed integral with the free ends of said arms for engaging the edge of said lens and holding the lens against pivotal movement relative to said screw.

3. An ophthalmic mounting comprising a single strap member having a threaded aperture, said member being positioned against the rear face of a lens having an opening, a screw passing through the opening and threaded into the aperture for securing the strap to the lens, resilient arms extending outwardly from the member, said arms overlying the edge portion of the rear face of the lens and with only the end portions of said arms in contact with spaced areas on the rear surface of the lens and adjacent the edge thereof whereby the arms normally urge the strap away from the lens and thereby hold the screw threads in binding engagement, the end portions of the arms having parts engaging the edge of the lens whereby the lens is held against pivotal movement relative to the screw.

JOSEPH W. ASPENLEITER.